United States Patent
Flemin

(10) Patent No.: US 12,188,362 B2
(45) Date of Patent: Jan. 7, 2025

(54) NACELLE OF AN AIRCRAFT ENGINE, COMPRISING AN IMPROVED HEAT EXCHANGER

(71) Applicant: Airbus Operations SAS, Toulouse (FR)

(72) Inventor: Christian Flemin, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/457,134

(22) Filed: Aug. 28, 2023

(65) Prior Publication Data
US 2024/0068381 A1    Feb. 29, 2024

(30) Foreign Application Priority Data

Aug. 30, 2022   (FR) ...................................... 2208663

(51) Int. Cl.
*B64D 29/00* (2006.01)
*F01D 25/12* (2006.01)
*B64D 33/02* (2006.01)
*B64D 33/08* (2006.01)

(52) U.S. Cl.
CPC ............. *F01D 25/12* (2013.01); *B64D 29/00* (2013.01); *B64D 2033/024* (2013.01); *B64D 33/08* (2013.01); *F05D 2260/20* (2013.01); *F05D 2260/207* (2013.01); *F05D 2260/213* (2013.01)

(58) Field of Classification Search
CPC ......... F01D 25/12; B64D 29/00; B64D 33/08; B64D 2033/024; F05D 2260/20; F05D 2260/207; F05D 2260/213
See application file for complete search history.

(56) References Cited

U.S. PATENT DOCUMENTS

| 10,487,690 | B2  |    | 11/2019 | Woolworth et al. |
|------------|-----|----|---------|------------------|
| 10,654,579 | B2  |    | 5/2020  | Diaz             |
| 2014/0369812 | A1 | *  | 12/2014 | Caruel ...................... F02C 7/12 |
|            |     |    |         | 415/116 |
| 2017/0114721 | A1 | *  | 4/2017  | Miller ....................... F02C 7/185 |
| 2017/0167382 | A1 | *  | 6/2017  | Miller ..................... B64D 15/06 |
| 2020/0362758 | A1 |    | 11/2020 | Peyron et al. |
| 2021/0148283 | A1 | *  | 5/2021  | Niergarth ................. F01D 25/12 |
| 2021/0231057 | A1 |    | 7/2021  | Livebardon et al. |

FOREIGN PATENT DOCUMENTS

EP          3719277 A1    10/2020

OTHER PUBLICATIONS

French Search Report for corresponding French Patent Application No. 2208663 dated May 4, 2023.

* cited by examiner

*Primary Examiner* — David E Sosnowski
*Assistant Examiner* — Theodore C Ribadeneyra
(74) *Attorney, Agent, or Firm* — Greer, Burns & Crain, Ltd.

(57) ABSTRACT

An aircraft engine nacelle in which the inner fixed structure has a heat exchanger which is filled with a two-phase heat transfer fluid and which comprises a tube forming a loop with front, rear, lower and upper strands, and also a first complementary strand between the central zones of the front strand and of the upper strand, a second complementary strand between the central zones of the front strand and of the lower strand, a third complementary strand between the central zones of the rear strand and of the upper strand, and a fourth complementary strand between the central zones of the rear strand and of the lower strand.

7 Claims, 2 Drawing Sheets

NACELLE OF AN AIRCRAFT ENGINE, COMPRISING AN IMPROVED HEAT EXCHANGER

CROSS-REFERENCES TO RELATED APPLICATIONS

This application claims the benefit of French Patent Application Number 2208663 filed on Aug. 30, 2022, the entire disclosure of which is incorporated herein by way of reference.

FIELD OF THE INVENTION

The present invention relates to a nacelle of an engine of an aircraft, comprising a particular heat exchanger allowing the transport, the distribution and the exchange of heat, and also to an aircraft comprising an engine equipped with such a nacelle.

BACKGROUND OF THE INVENTION

An aircraft conventionally comprises engines such as turbojet engines. Each engine comprises a hub which is supplied with fuel in order to operate the engine and move the aircraft.

The engine also comprises a nacelle which surrounds the hub and which guides air inside the engine and constitutes an aerodynamic surface of the engine.

The nacelle comprises, on the inside, an inner fixed structure (IFS) which goes around the hub and delimits with said hub a channel for air, and on the outside of the inner fixed structure, an outer fixed structure (OFS) which forms the aerodynamic surface.

Disposed in the nacelle, in particular in the inner fixed structure, are heat exchangers that are connected by a one-phase or two-phase fluid system for transporting heat. In general, a one-phase fluid system has lower performance than a two-phase fluid system, and is less attractive than a two-phase fluid system in terms of mass, complexity, cost and transport capacity. The two-phase fluid system for distributing and transporting heat is implemented either with the aid of heat pipes operating, by definition, with capillary pumping, or with the aid of fluid loops with capillary or mechanical pumping. In the case of a two-phase fluid loop, a two-phase system for transporting heat comprises a tube which forms a loop and inside which a two-phase heat transfer fluid circulates, a portion of which passes into vapour phase in a hot zone (called evaporator) by recovering heat from the inner fixed structure by virtue of the latent heat of vaporization, transports this heat and then releases it by passing into liquid phase in a cold zone (called condenser) by virtue of the latent heat of condensation. The two-phase heat transfer fluid is driven either by capillary pumping, or by a mechanical pump fluidically connected to the tube and the fluid thus circulates in the loop by returning to the pump. The loop extends from the front to the rear of the inner fixed structure, that is to say between the hottest part of the engine in which the fluid is heated by capturing heat energy in the evaporator zone of the loop in the hot zones of the hub and the coldest part of the engine in which the fluid is cooled by releasing heat energy to the outside air via the cold inner fixed structure of the nacelle in the condenser zone of the loop. The two-phase fluid loop with mechanical pumping may also be replaced by a two-phase fluid loop with capillary pumping or by a capillary pumped tube which is filled with a two-phase heat transfer fluid and called heat pipe: such a heat pipe allows heat to be transported and distributed between its evaporation zone and its condensation zone. The operation of the two-phase fluid loop with capillary pumping may be assisted by coupling the two-phase fluid loop to a low-power centrifugal pump, but this hybridization is complex because the pump has to be controlled so that the evaporator remains in its operating range and adapts to the heat flow to be collected. In the case of the fluid loop with capillary pumping, the liquid phase of the heat transfer fluid is moved by a capillary structure at its core (called porous wick), said structure being situated in the evaporator and also comprising a tank making it possible to ensure the flow of fluid, irrespective of the quantity of fluid, in dependence on its temperature. In the case of the heat pipe, the liquid phase of the heat transfer fluid is moved by a capillary structure internal to the heat pipe.

During its travel in the two-phase loop or in the heat pipe and as a function of its characteristics, the heat transfer fluid can change phase as a function of the temperature.

When the aircraft is in flight, as a function of the phases of flight, the aircraft may turn by banking to the side, raise the nose or lower it. In these cases, the liquid phase of the two-phase heat transfer fluid, which is heavier than the gaseous phase of the heat transfer fluid, will move inside the tube as a function of gravity and the apparent acceleration to which it is subjected. In certain cases, this movement runs counter to the movement that it should perform in the loop or in the heat pipe, and, in addition, the liquid phase of the heat transfer fluid is not distributed over the entire internal surface of the tube because a pool is created, and this may significantly reduce the effectiveness of the thermal exchanges in the evaporator and condenser zone, and therefore reduce the effectiveness of the cooling of the inner fixed structure of the nacelle in the hot zones.

SUMMARY OF THE INVENTION

An object of the present invention is to propose a nacelle comprising a heat exchanger which ensures the transport, the distribution and the exchange of heat and in which the heat transfer fluid flows in a satisfactory manner even when the plane experiences altitude changes and apparent accelerations.

To that end, a nacelle for an engine of an aircraft is proposed, the nacelle comprising an inner fixed structure which has two inner cowls and, for each inner cowl, a heat exchanger in which a two-phase heat transfer fluid circulates and which is secured to said inner cowl, wherein the heat exchanger comprises:

a tube which forms a loop with a front strand, a rear strand, a lower strand and an upper strand, and
an evaporator zone located on the rear strand,
the nacelle being characterized in that the heat exchanger comprises:
a first complementary strand which fluidically connects a central zone of the front strand to a central zone of the upper strand,
a second complementary strand which fluidically connects a central zone of the front strand to a central zone of the lower strand,
a third complementary strand which fluidically connects a central zone of the rear strand to a central zone of the upper strand, and
a fourth complementary strand which fluidically connects a central zone of the rear strand to a central zone of the lower strand.

With such an implementation of the strands, even if the aircraft experiences changes in position and in acceleration, the heat transfer fluid will flow from the front to the rear then from the rear to the front through at least one of the strands.

Advantageously, the heat exchanger comprises:
- a first supplementary strand which fluidically connects a zone of intersection between the front strand and the upper strand to a zone of intersection between the rear strand and the lower strand, and
- a second supplementary strand which fluidically connects a zone of intersection between the front strand and the lower strand to a zone of intersection between the rear strand and the upper strand, the first supplementary strand and the second supplementary strand are fluidically connected to one another at their central zones, and between each end of a supplementary strand and the central zone of said supplementary strand, said supplementary strand is fluidically connected to the complementary strand which it intersects.

Advantageously, the heat exchanger comprises:
- a first additional strand which fluidically connects the central zone of the front strand to the central zone of the rear strand, and
- a second additional strand which fluidically connects the central zone of the lower strand to the central zone of the upper strand, and the first additional strand and the second additional strand are fluidically connected to one another at their central zones and the central zones of the additional strands are fluidically connected to the central zones of the supplementary strands.

Advantageously, the angle between two strands which intersect is greater than or equal to 45°.

Advantageously, each inner cowl comprises a core and, on each face of the core, a skin which is secured to said face of the core, a face of the core has, for each strand, a channel in which the strand is fastened between the bottom of the channel and the skin which is secured to said face.

The invention also proposes an aircraft comprising an engine with a hub and a nacelle according to one of the preceding variants, wherein the hub is housed inside the inner fixed structure which constitutes an internal part of a secondary duct of the engine.

Advantageously, the face having the channel is oriented towards the secondary duct.

BRIEF DESCRIPTION OF THE DRAWINGS

The features of the invention mentioned above, along with others, will become more clearly apparent upon reading the following description of an exemplary embodiment, said description being given with reference to the appended drawings, in which.

DETAILED DESCRIPTION OF THE PREFERRED EMBODIMENTS

Figure 1:
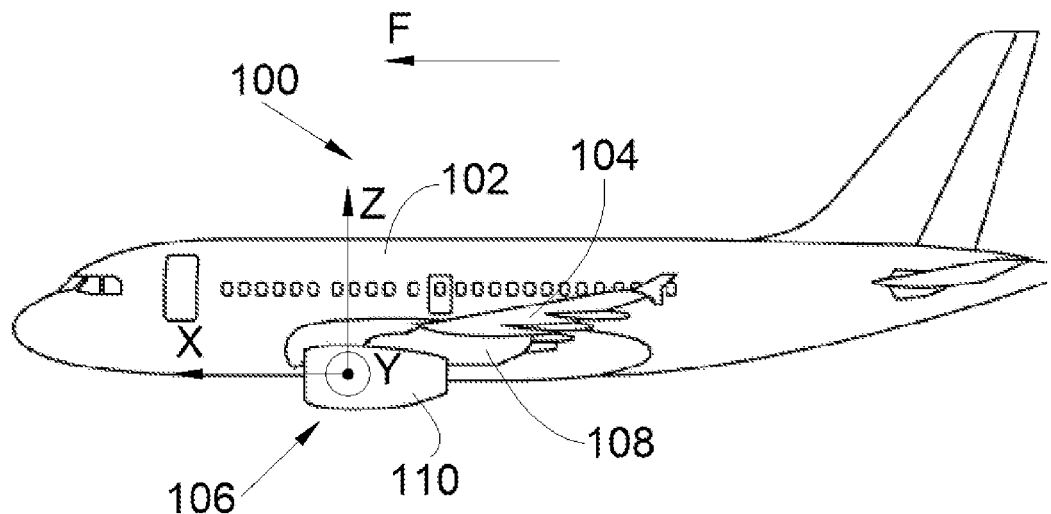
FIG. 1 is a side view of an aircraft according to the invention.

In the following description, terms relating to a position are considered in relation to an aircraft in a position of forward movement, i.e. as shown in FIG. 1 in which the arrow F shows the direction of forward movement of the aircraft when in flight.

FIG. 1 shows an aircraft 100 which comprises a fuselage 102 and a wing 104 on each side of the fuselage 102. Under each wing 104, the aircraft 100 has an engine 106 attached to the wing 104 by a pylon 108.

The engine 106 comprises a hub and a nacelle 110 which runs around the hub.

In the following description, and by convention, X denotes the longitudinal axis of the engine 106 which is oriented positively in the direction of forward movement of the aircraft 100, Y denotes the transverse direction which is horizontal when the aircraft is on the ground, and Z denotes the vertical direction or vertical height when the aircraft is on the ground, these three directions X, Y and Z being mutually orthogonal.

Figure 2:
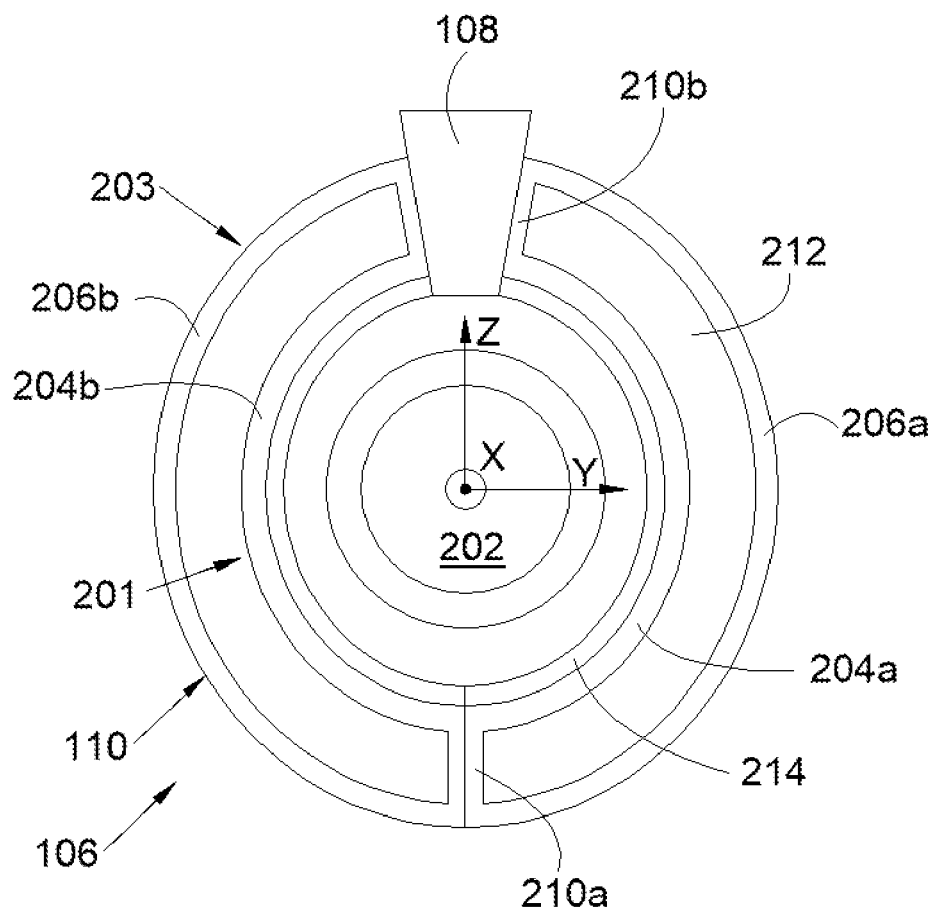
FIG. 2 is a schematic representation of a front view of an engine of the aircraft in FIG. 1.

FIG. 2 schematically shows the engine 106 which comprises the hub 202 which is housed in the nacelle 110 which comprises an inner fixed structure 201 and an outer fixed structure 203 which are fastened to the pylon 108.

In the embodiment of the invention presented here, the inner fixed structure 201 has two inner cowls 204a-b and the outer fixed structure 203 has two outer cowls 206a-b.

Each cowl 204a-b, 206a-b takes the overall form of a half-cylinder, and the nacelle 110 has, on either side of a substantially vertical mid-plane passing through the central axis of the hub 202, an inner cowl 204a-b and an associated outer cowl 206a-b. Thus, the inner cowls 204a-b are arranged around the hub 202 and the outer cowls 206a-b are arranged around the inner cowls 204a-b.

In the embodiment of the invention presented in FIG. 2, the inner cowl 204a-b and the outer cowl 206a-b which are on the same side are fastened to one another by lower radial structures 210a and upper radial structures 210b. Of course, it is possible for the cowls 204a-b and 206a-b to remain free from one another.

The two inner cowls 204a-b overall form a cylinder which surrounds the hub 202 and constitutes the internal part of a secondary duct 212 of the engine 106, a flow of fresh air coming from the front of the nacelle 110 circulating in said secondary duct, and the two outer cowls 206a-b overall form a cylinder which surrounds the inner cowls 204a-b and constitutes the external part of the secondary duct 212.

In the embodiment of the invention presented in FIG. 2, the inner fixed structure 201 comprises an insulating layer 214, called thermal protection, made up of a thermally insulating material which is fastened to the inside of the inner cowls 204a-b, that is to say between the hub 202 and said inner cowls 204a-b.

Figure 3:
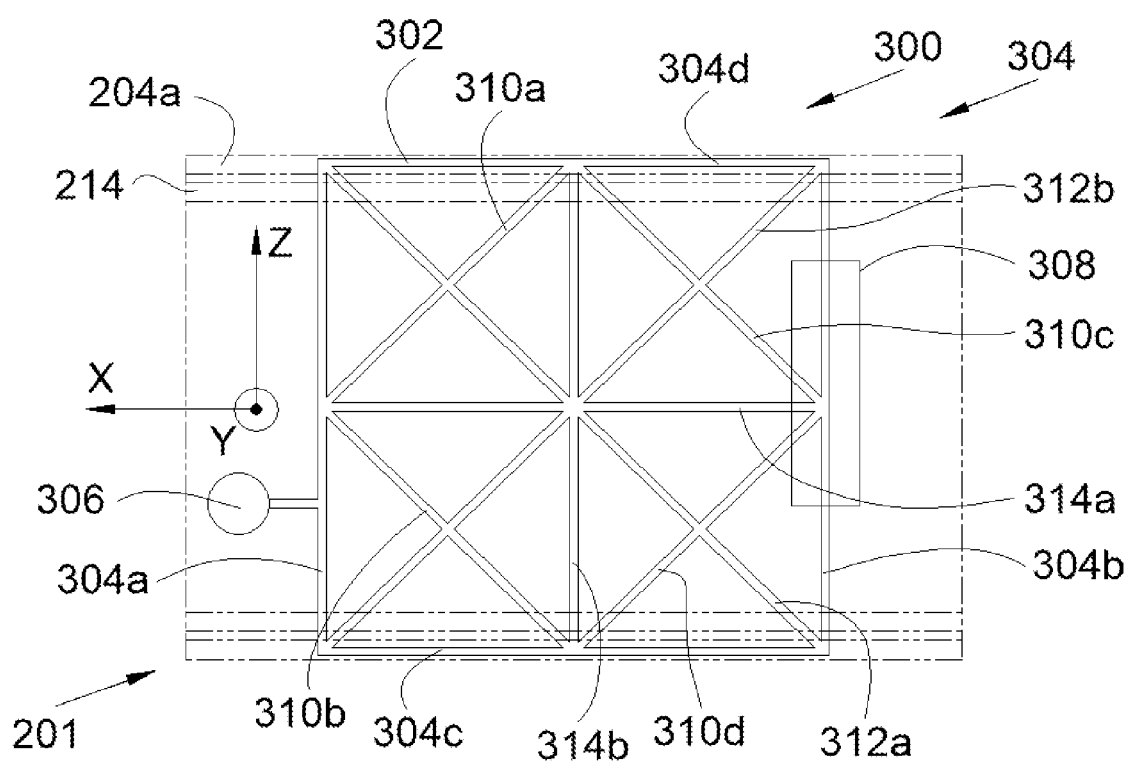
FIG. 3 is a side view of a heat exchanger according to the invention set up in an inner fixed structure of the engine.

FIG. 3 shows a side view of half of the inner fixed structure 201, with the inner cowl 204a and the insulating layer 214 shown in outline.

The nacelle 110 comprises, for each inner cowl 204a, a heat exchanger 300 in which a heat transfer fluid circulates and which is secured to said inner cowl 204a. The heat exchanger 300 makes it possible to capture, transport and distribute heat from the hot rear part of the inner cowl 204a towards the front part of the inner cowl 204a. The heat exchanger 300 comprises a tube 302 which forms a loop 304 which has a front strand 304a, a rear strand 304b, a lower strand 304c and an upper strand 304d.

The front strand 304a is arranged at a front part of the inner cowl 204a, and the rear strand 304b is arranged at a rear part of the inner cowl 204a and is therefore behind the front strand 304a. The upper strand 304d is arranged at a top part of the inner cowl 204a, and the lower strand 304c is arranged at a bottom part of the inner cowl 204a and is therefore below the upper strand 304d.

The lower strand 304c and the upper strand 304d are overall parallel to the longitudinal direction X, and the front strand 304a and the rear strand 304b are each in a vertical plane perpendicular to the longitudinal direction X.

In side view, the loop 304 has the form of a rectangle, but the front strand 304a and the rear strand 304b are arched so as to follow the geometry of the inner cowl 204a.

The tube 302 is filled with a two-phase gas-liquid heat transfer fluid. In the case of a fluid loop with mechanical pumping or of a hybrid fluid loop with capillary and mechanical pumping, the heat exchanger 300 comprises a pump 306, for example a mechanical pump, located on one of the strands 304a-b of the loop 304, in this case the front strand 304a, in order to drive the two-phase heat transfer fluid in movement. In the case of the use of two-phase fluid loops with capillary pumping (which are constituted by an evaporator, a tank and a network of condenser tubes) or of the use of heat pipes operating by capillary pumping, on the strands 304a-d of the loop 304, the pump 306 is optional.

The heat exchanger 300 comprises an evaporator zone 308 which is located on the rear strand 304b and which dissipates the heat energy of the two-phase heat transfer fluid towards the outside air, in particular towards the air circulating in the secondary duct 212, and also transports a certain portion of the heat stored in the inner cowl 204a towards the front strand 304a situated in a zone having a colder internal thermal environment, the engine 106 being hotter at the rear. The front part of the inner cowl 204a is the cold part and the rear part of the inner cowl 204a is the hot part.

In the case of a two-phase loop with mechanical pumping or with hybrid mechanical and capillary pumping, under the action of the pump 306, the heat transfer fluid in liquid phase is set into movement at the front strand 304a, takes up heat energy at the rear strand 304b and passes into gaseous phase at the evaporator 308, it then circulates in the loop 304 so as to reach the front strand 304a in which the heat energy is dissipated in order to cool the heat transfer fluid which passes back into liquid phase.

To compensate for the effects of the movements of the aircraft 100 in the case of capillary pumping with fluid loop or heat pipe, and to avoid the liquid phase of the heat transfer fluid circulating less effectively and reaching the evaporator 308 with difficulty, the heat exchanger 300 comprises:
- a first complementary strand 310a which fluidically connects a central zone of the front strand 304a to a central zone of the upper strand 304d, by way of a capillary node in the case of capillary pumping,
- a second complementary strand 310b which fluidically connects a central zone of the front strand 304a to a central zone of the lower strand 304c, by way of a capillary node in the case of capillary pumping,
- a third complementary strand 310c which fluidically connects a central zone of the rear strand 304b to a central zone of the upper strand 304d, by way of a capillary node in the case of capillary pumping, and
- a fourth complementary strand 310d which fluidically connects a central zone of the rear strand 304b to a central zone of the lower strand 304c, by way of a capillary node in the case of capillary pumping.

Each complementary strand 310a-d is a tube in which the heat transfer fluid circulates, and thus each forms a diverting line which allows the heat transfer fluid to be diverted to reach the evaporator 308 depending on the position of the aircraft 100.

The complementary strands 310a-d form, viewed from the side, a rhombus which ensures a passage for the heat transfer fluid in particular when the nose of the aircraft 100 is lowered or raised. Each complementary strand 310a-d is arched so as to follow the geometry of the inner cowl 204a.

To compensate even better for the effects of the movements of the aircraft 100, the heat exchanger 300 comprises:
- a first supplementary strand 312a which fluidically connects a zone of intersection between the front strand 304a and the upper strand 304d to a zone of intersection between the rear strand 304b and the lower strand 304c, by way of a capillary node in the case of capillary pumping, and
- a second supplementary strand 312b which fluidically connects a zone of intersection between the front strand 304a and the lower strand 304c to a zone of intersection between the rear strand 304b and the upper strand 304d, by way of a capillary node in the case of capillary pumping.

The first supplementary strand 312a and the second supplementary strand 312b are fluidically connected to one another at their central zones, by way of a capillary node in the case of capillary pumping.

Between each end of a supplementary strand 312a-b and the central zone of said supplementary strand 312a-b, said supplementary strand 312a-b is fluidically connected to the complementary strand 310a-d which it intersects, by way of a capillary node in the case of capillary pumping.

Each supplementary strand 312a-b is a tube in which the heat transfer fluid circulates, and thus each forms a diverting line which allows the heat transfer fluid to be diverted to reach the evaporator 308 depending on the position of the aircraft 100.

The supplementary strands 312a-b form, viewed from the side, an X and each supplementary strand 312a-b is arched so as to follow the geometry of the inner cowl 204a.

To compensate even better for the effects of the movements of the aircraft 100, the heat exchanger 300 comprises:
- a first additional strand 314a which fluidically connects the central zone of the front strand 304a to the central zone of the rear strand 304b, by way of a capillary node in the case of capillary pumping, and
- a second additional strand 314b which fluidically connects the central zone of the lower strand 304c to the central zone of the upper strand 304d, by way of a capillary node in the case of capillary pumping.

The first additional strand 314a and the second additional strand 314b are fluidically connected to one another at their central zones and the central zones of the additional strands 314a-b are fluidically connected to the central zones of the supplementary strands 312a-b, by way of a capillary node in the case of capillary pumping.

Each additional strand 314a-b is a tube in which the heat transfer fluid circulates, and thus each forms a diverting line which allows the heat transfer fluid to be diverted to reach the evaporator 308 depending on the position of the aircraft 100.

The additional strands 314a-b form, viewed from the side, a cross and each additional strand 314a-b is arched so as to follow the geometry of the inner cowl 204a.

The heat exchanger 300 also ensures better homogenization of the temperature due to the transport of heat in all directions, the reduction of temperature gradients and by avoiding hot points in the inner cowl 204a.

To ensure a sufficient angle between the strands and thus a sufficient diversion of the heat transfer fluid if necessary, the angle between two strands 310a-d, 312a-b, 314a-b which intersect is greater than or equal to 45°. In the embodiment of the invention presented in FIG. 3, the angles between two strands are equal to 45° or to 90°.

Figure 4:
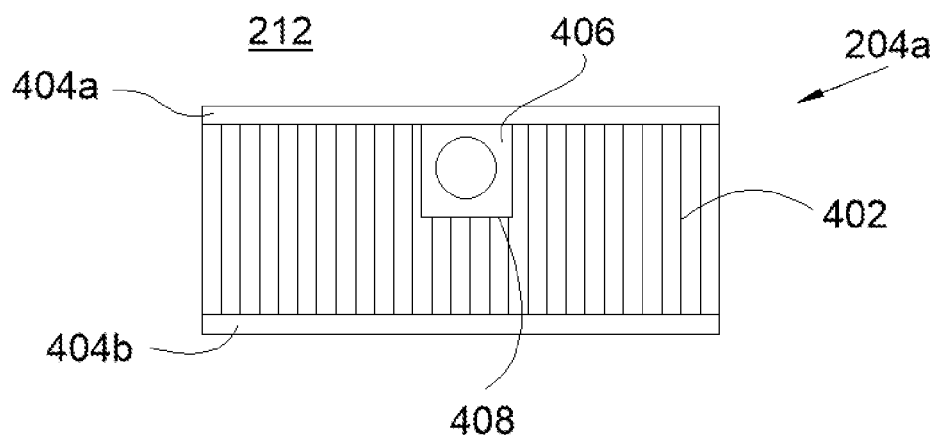
FIG. 4 is a view in section of the inner fixed structure of the engine.

FIG. 4 shows a view in section of the inner fixed structure 201 and more particularly of the inner cowl 204a which takes the form of a sandwich structure with a core 402 in particular of honeycomb form and, on each face of the core 402, a skin 404a-b which is secured to said face of the core 402.

For each strand 406, a face of the core 402 is machined so as to produce a channel 408 in which the strand 406 is fastened, for example by adhesive bonding, between the bottom of the channel 408 and the skin 404a which is secured to said face.

In the embodiment of the invention presented in FIG. 4, the external section of the strand 406 is square with a passage of circular internal section for the passage of the heat transfer fluid. The strand 406 is manufactured for example by extrusion.

The material of the strand 406 may be made, for example, of aluminum alloy, of copper alloy, of stainless steel or of nickel alloy.

The liquid phase and the gaseous phase of the two-phase heat transfer fluid are present inside the strands at proportions which are dependent on the temperature. The two-phase heat transfer fluid is chosen as a function of its compatibility with the material of the strand 406 and of its physico-chemical properties as a function of the operating temperature range of the exchanger: the two-phase heat transfer fluid may be, for example, freon (typically up to 120° C.) associated with a strand 406 made of aluminum alloy, methanol or water (typically up to 200° C.) associated with a strand 406 made of copper alloy, or sulfur (typically up to 650° C.) associated with a strand 406 made of stainless steel, or potassium (typically up to 850° C.) associated with a strand 406 made of nickel alloy.

Preferably, the face having the channel 408 is oriented towards the secondary duct 212 and the non-machined face is oriented towards the hub 202, but an inverse orientation is also possible.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle for an engine of an aircraft, the nacelle comprising:
   an inner fixed structure which has two inner cowls and, for each inner cowl, a heat exchanger in which a two-phase heat transfer fluid circulates and which is secured to said inner cowl, wherein the heat exchanger comprises:
   a tube which forms a loop with a front strand, a rear strand, a lower strand and an upper strand,
   an evaporator zone located on the rear strand,
   a first complementary strand which fluidically connects a central zone of the front strand to a central zone of the upper strand,
   a second complementary strand which fluidically connects the central zone of the front strand to a central zone of the lower strand,
   a third complementary strand which fluidically connects a central zone of the rear strand to the central zone of the upper strand, and
   a fourth complementary strand which fluidically connects the central zone of the rear strand to the central zone of the lower strand.

2. The nacelle according to claim 1, wherein the heat exchanger further comprises:
   a first supplementary strand which fluidically connects a zone of intersection between the front strand and the upper strand to a zone of intersection between the rear strand and the lower strand, and
   a second supplementary strand which fluidically connects a zone of intersection between the front strand and the lower strand to a zone of intersection between the rear strand and the upper strand,
   wherein the first supplementary strand and the second supplementary strand are fluidically connected to one another at their central zones, and
   wherein between each end of each supplementary strand and the central zone of each supplementary strand, said supplementary strand is fluidically connected to the complementary strand which it intersects.

3. The nacelle according to claim 2, wherein the heat exchanger further comprises:
   a first additional strand which fluidically connects the central zone of the front strand to the central zone of the rear strand, and
   a second additional strand which fluidically connects the central zone of the lower strand to the central zone of the upper strand, and
   wherein the first additional strand and the second additional strand are fluidically connected to one another at their central zones and the central zones of the additional strands are fluidically connected to the central zones of the supplementary strands.

4. The nacelle according to claim 1, wherein an angle between two strands which intersect is greater than or equal to 45°.

5. The nacelle according to claim 1, wherein each inner cowl comprises a core and, on each face of the core, a skin which is secured to said face of the core,
   wherein each face of the core has, for each strand, a channel in which the strand is fastened between a bottom of the channel and the skin which is secured to said face.

6. An aircraft comprising:
   an engine with a hub and the nacelle according to claim 5,
   wherein the hub is housed inside the inner fixed structure which constitutes an internal part of a secondary duct of the engine, and
   wherein the face having the channel is oriented towards the secondary duct.

7. An aircraft comprising:
   an engine with a hub and the nacelle according to claim 1,
   wherein the hub is housed inside the inner fixed structure which constitutes an internal part of a secondary duct of the engine.

* * * * *